(12) United States Patent
Schoenerstedt

(10) Patent No.: US 9,008,678 B2
(45) Date of Patent: Apr. 14, 2015

(54) DYNAMIC MULTIPLE INPUT AND MULTIPLE OUTPUT CELL CLUSTER

(75) Inventor: Lutz Schoenerstedt, Ludwigsburg (DE)

(73) Assignee: Alcatel Lucent, Boulogne-Billancourt (FR)

( * ) Notice: Subject to any disclaimer, the term of this patent is extended or adjusted under 35 U.S.C. 154(b) by 95 days.

(21) Appl. No.: 13/989,558

(22) PCT Filed: Nov. 17, 2011

(86) PCT No.: PCT/EP2011/070328
§ 371 (c)(1),
(2), (4) Date: May 24, 2013

(87) PCT Pub. No.: WO2012/069352
PCT Pub. Date: May 31, 2012

(65) Prior Publication Data
US 2013/0244682 A1  Sep. 19, 2013

(30) Foreign Application Priority Data
Nov. 25, 2010  (EP) .................................... 10290627

(51) Int. Cl.
H04W 72/00 (2009.01)
H04W 72/08 (2009.01)
H04W 24/00 (2009.01)
H04L 5/00 (2006.01)
H04W 24/10 (2009.01)
H04W 28/04 (2009.01)

(52) U.S. Cl.
CPC ............ *H04W 72/085* (2013.01); *H04W 24/00* (2013.01); *H04L 5/006* (2013.01); *H04W 24/10* (2013.01); *H04W 28/048* (2013.01); *H04L 5/001* (2013.01); *H04L 5/0023* (2013.01)

(58) Field of Classification Search
USPC ........... 455/452.1, 452.2, 450, 464, 509, 524; 370/329, 328; 375/267
See application file for complete search history.

(56) References Cited

U.S. PATENT DOCUMENTS

2009/0312027 A1  12/2009  Foschini et al.
2010/0034151 A1*  2/2010  Alexiou et al. ............... 370/329

FOREIGN PATENT DOCUMENTS

WO  WO 2010/060185 A1  6/2010

OTHER PUBLICATIONS

Alcatel-Lucent et al., "Technical Aspects for Heterogeneous Networks," 3rd Generation Partnership Project (3GPP), 3GPP TSG RAN WG1 Meeting #59bis, R1-100441, XP050418086, 3 pages, Valencia, Spain, Jan. 18-22, 2010.
International Search Report for PCT/EP2011/070328 dated Feb. 15, 2012.

* cited by examiner

*Primary Examiner* — Vladimir Magloire
*Assistant Examiner* — Sayed T Zewari
(74) *Attorney, Agent, or Firm* — Fay Sharpe, LLP

(57) ABSTRACT

The invention relates to a method of grouping a first plurality of cells contained in a subset of cells of a wireless telecommunication network (100) to a first cluster for receiving uplink data from a mobile telecommunication device (106; 200), and grouping a second plurality of cells contained in the subset of cells to a second cluster for transmitting downlink data to the mobile telecommunication device.

12 Claims, 5 Drawing Sheets

DYNAMIC MULTIPLE INPUT AND MULTIPLE OUTPUT CELL CLUSTER

FIELD OF THE INVENTION

The invention relates to the field of mobile telecommunication networks, more specifically to multiple input and multiple output transmission schemes in mobile telecommunication networks.

BACKGROUND AND RELATED ART

Multiple input and multiple output (MIMO) data transmission schemes use multiple antennas of multiple base stations for transmitting and receiving data in order to improve communication performance. Transmitting data according to a MIMO data transmission scheme offers a significant increase in data throughput and link range without additional bandwidth or transmission power. This is achieved by higher spectral efficiency and link reliability or diversity.

MIMO data transmission schemes are applied in static cell clusters. Such a cell cluster comprises a plurality of cells transmitting data according to a MIMO data transmission scheme.

US 2010/0034151 A1 discloses a method for implementation in a first functional entity in a wireless communication system that includes a first plurality of base stations for providing wireless connectivity to at least one mobile unit.

WO 2010/060185 A1 discloses a method and system for identifying cell clusters within a coordinated multiple point wireless transmission network in order to reduce scheduling complexity while optimizing throughput and performance.

SUMMARY

It is an object of the present invention to provide an improved method of grouping a plurality of cells, an improved base station, an improved computer readable storage medium, and an improved wireless telecommunication system.

This object is achieved by the method, the base station, the computer readable storage medium, and the wireless telecommunication system according to the independent claims. Embodiments of the invention are given in the dependent claims.

The invention relates to a method of grouping a first plurality of cells contained in a subset of cells of a wireless telecommunication network to a first cluster for receiving uplink data from a mobile telecommunication device. A second plurality of cells contained in the subset of cells is grouped to a second cluster for transmitting downlink data to the mobile telecommunication device.

A measurement of signal power and/or signal quality of signals received by the mobile telecommunication device from at least one cell of the wireless telecommunication network is performed by the mobile telecommunication device. A measurement report is then generated by the mobile telecommunication device. The measurement report comprises measurement results of the measurement. The measurement results are compared with a first criterion. The first criterion may for example be a minimum signal power level and/or a minimum signal quality level. The first criterion may be a dynamical criterion. This means that for example a threshold is adjusted and/or the criterion is changed in another way. The minimum signal power and/or signal quality level may be defined by an absolute value or by a relative value. In the latter case the minimum signal power value is defined by a maximum difference of the signal power with respect to the best measured signal power.

Alternatively, the information of the measurement report could also be obtained by uplink measurements of at least one base station. This is especially advantageous in time division duplex systems but also applicable in other systems, e.g. in a frequency division duplex system.

First candidate cells are selected for the first cluster and second candidate cells are selected for the second cluster. It is to be noted that at this point the first and the second cluster are not yet determined. The respective cluster comprises at least one cell of the respective candidate cells. The received signals of the candidate cells fulfill the first criterion. Selecting the candidate cells is performed individually for the mobile telecommunication device. The candidate cells constitute the subset of cells. In other words, candidate cells for the uplink and the downlink cluster are selected for the mobile telecommunication device. Selection is performed only for the mobile telecommunication device and not for a plurality of mobile telecommunication devices. For each mobile telecommunication device candidate cells are selected individually. The first cluster is the cluster for uplink communication, while the second cluster is the cluster for downlink communication.

The first and the second plurality of cells are selected individually for allocable resources from the subset of cells. The first plurality of cells fulfills at least one second criterion and the second plurality of cells fulfills at least one third criterion. The second and the third criterion are criteria considering scheduling decisions in the candidate cells. In other words, the cells used for the MIMO data transmission scheme are selected individually for allocable resources from the subset of cells. Only those cells are selected, which are determined to improve data transmission to and from the mobile telecommunication device. This is why scheduling decisions in the cells are considered for selecting the first and the second plurality of cells individually for allocable resources. In the first and the second plurality of cells there must be enough resources for scheduling MIMO data transmissions from and to the mobile telecommunication device.

The first plurality of cells is then grouped to the first cluster and the second plurality of cells is grouped to the second cluster. In other words, the first and the second cluster comprise cells, which are grouped to the clusters individually for the mobile telecommunication device and for the respective at least one allocable resource. For each mobile telecommunication device and for each allocable resource, individual clusters are grouped.

Grouping the first plurality of cells to the first cluster and grouping the second plurality of cells to the second cluster is performed in a frequency selective way. A more detailed measurement report is transmitted from the respective mobile telecommunication device to the serving base station. The more detailed measurement report comprises detailed information about the respective channel between the mobile telecommunication device and the serving base station. These information may for example be a signal delay, a phase shift, an attenuation, an interference estimation, a precoding weighting, and/or a code book index. Interference estimation may for example comprise a correlation matrix.

Alternatively, the information of the more details measurement report could also be obtained by uplink measurements of at least one base station. This is especially advantageous in time division duplex systems but also applicable in other systems, e.g. in a frequency division duplex system.

Scheduling may also be performed in a frequency-selective manner. For example, there may be two candidate cells for the first cluster. The first of the two candidate cells is used solely as the first cluster for scheduling data transmissions on an allocable resource. The second of the two candidate cells is used solely as the first cluster for scheduling data transmission on a second allocable resource.

A master cell is selected for managing the MIMO data transmission scheme. The master cell fulfills a fourth criterion. The fourth criterion may for example be a minimum connection quality for receiving uplink data from the mobile telecommunication device. The master cell is preferably the cell with the highest connection quality and/or the best connection reliability to the mobile telecommunication device. The master cell manages the MIMO data transmission scheme performed by the first and the second cluster.

The minimum connection quality may be defined by an absolute value or by a relative value. In the latter case the minimum connection quality is defined by a maximum difference of the connection quality with respect to the best measured connection quality.

Uplink scheduling is performed in the first cluster, while downlink scheduling is performed in the second cluster. The first and the second cluster may comprise the same cells or different cells.

According to the embodiments of the invention the master cell is a candidate cell. It is to be noted that in other embodiments of the invention the master cell may also be selected from all cells of the wireless telecommunication network. The master cell may consequently be also not a candidate cell.

According to embodiments of the invention the measurement report comprises a desired MIMO transmission scheme and a pre-selection of the mobile telecommunication device for the second plurality of cells. In other words, the measurement report is indicative of a MIMO transmission scheme and a second plurality of cells. The MIMO transmission scheme and the second plurality of cells are taken into account for selecting the first and the second plurality of cells. In other words, the mobile telecommunication device transmits information about the MIMO transmission scheme and a suggestion of the second plurality of cells together with the measurement report to the base station managing the data transmissions from and to the mobile telecommunication device. The base station then uses the MIMO transmission scheme for selecting the first and the second plurality of cells. Also the suggestion transmitted from the mobile telecommunication device to the base station for the second plurality of cells is considered for selecting the first and the second plurality of cells. The MIMO transmission scheme may for example be a specific single-user or a specific multi-user MIMO transmission scheme. The MIMO transmission scheme may for example be selected for minimizing interferences and/or increasing the transmission rate.

According to embodiments of the invention the measurement report is transmitted to a base station. The selecting and/or the groupings are performed by the base station. It is to be noted that in other embodiments of the invention the selecting and/or the grouping may be performed by at least one network entity.

According to embodiments of the invention the first criterion comprises a minimum signal power level and/or a minimum signal quality level. The minimum signal power level and/or the minimum signal quality level are adjusted dynamically.

According to embodiments of the invention the second and the third criterion are criteria considering scheduling decisions in the candidate cells.

According to embodiments of the invention the first criterion comprises an amount of traffic exchanged between the candidate cells. In other words, the amount of traffic exchanged between the candidate cells is considered when selecting the candidate cells. The candidate cells are those cells, from which the first and the second plurality of cells are selected. Selecting of the first and the second plurality of cells is performed individually for allocable resources dynamically and the first and the second plurality of cells may change rapidly. This may for example be the case for rapidly changing channel conditions. This is why the master cell receives data being received from the mobile telecommunication device by any other cell via the backbone of the mobile telecommunication network. Data being transmitted to the mobile telecommunication device is exchanged between the candidate cells in order to allow a fast switching of the first and the second plurality of cells. Hence, it is preferred to have candidate cells with enough resources for exchanging traffic on the backbone of the wireless telecommunication network between the candidate cells.

According to embodiments of the invention the fourth criterion is a minimum connection quality for receiving uplink data from the mobile telecommunication device. It is preferred that the master cell is the cell with the best connection quality to the mobile telecommunication device, especially for receiving uplink data from the mobile telecommunication device. The master cell coordinates the MIMO data transmission scheme.

According to embodiments of the invention a cell of the first or the second plurality of cells receives a first signal from the master cell and at least one second signal from a further master cell. The further master cell coordinates a third cluster, wherein the third cluster comprises said cell. The first signal is indicative of a first priority value for a resource and the second signal is indicative of a second priority value for the resource. Said cell takes into account the first and the second priority value for resource allocation. This is performed individually for the first and the second plurality of cells. In other words, scheduling and priority values of the first plurality of cells may not influence scheduling and priority values of the second plurality of cells. Alternatively, scheduling and priority values of the first plurality of cells influence scheduling and priority values of the second plurality of cells and vice versa.

In other words, one cell may be part of two MIMO data transmission schemes for different mobile telecommunication devices. In this case both MIMO data transmission schemes compete for resources in this cell. The master cells of both MIMO data transmission schemes transmit signals to the respective cell. The signals are indicative of priority values. The priority values each indicate how urgent the respective master cell needs the respective resource. The further master cell may need the resource less urgently and transmit a lower priority value to the respective cell. In this case the respective resource is allocated by the cell to the master cell of the second and the first plurality of cells. It is to be noted that the priority values of the first and the second plurality of cells are independent from each other.

According to embodiments of the invention receiving the first and the second signal and taking into account the first and the second priority value is performed iteratively. This is advantageous because the resource is for example not allocated to the further master cell. This results in the fact that the master cell determines a higher priority value for another resource in the same or another cell. Thus, after each allocation of a resource the priority values for other resources may change and the method needs to be performed iteratively.

After each allocation of a resource a feedback signal is transmitted to at least the cell, to which the respective resource has been allocated. Alternatively, the feedback signal is transmitted to every cell having transmitted priority values for this resource. The feedback signal is indicative of the fact, if the resource has been allocated to the cell having received the feedback signal. Hence, when a feedback signal is transmitted to every cell having transmitted priority values for the resource, one positive feedback signal is transmitted to the cell, to which the resource has been allocated. A negative feedback signal is transmitted to every other cell having previously transmitted a priority value, to which the resource has not been allocated.

Alternatively, the negative feedback signal could also be transmitted only to a subgroup of the other cells having previously transmitted a priority value. The subgroup may be chosen in order to minimize signaling effort. For example, the cell, which has transmitted the negative feedback signal, determines to exclude at least one cell from the next transmission of priority values for a resource. In this case, the negative feedback signal is not transmitted to this at least one cell. In other words, the subgroup comprises every cell having previously transmitted a priority value except for this at least one cell. This may for example be advantageous for minimizing signalizing effort.

Additionally, the negative feedback signal could comprise information about the priority value transmitted by the cell, to which the respective resource has been allocated. Additionally or alternatively, the positive and/or negative feedback signal could comprise any other information being used later on for iteratively performing the method according to embodiments of the invention.

Transmitting the negative feedback signal to at least one cell is necessary, when the method is performed iteratively.

After reception of a positive feedback signal, the master cell of the respective cluster decides about link adaption, resource allocation in other cells of the cluster, modulation scheme, and/or coding scheme. This is advantageous for coordinating data transmissions in the respective cluster. Care has to be taken that each cell may transmit data only for short time periods and/or small frequency blocks with data transmission breaks in between these time periods and/or frequency blocks, although data is always transmitted by at least one cell of the cluster. It is also to be noted that the clusters are grouped dynamically, which means that the configuration of the cells may change rapidly. A specific cell could for example be part of the first cluster at a first time point. This specific cell could then be excluded from the first cluster at a second time point. At a third time point the specific cell could again be part of the first cluster.

Hence, the master cell has to coordinate data transmission and/or reception such that data is permanently transmitted to the mobile terminal, although the configuration of the cluster changes dynamically and frequency selective. This is achieved by link adaptation, resource allocation, choice of a suitable modulation scheme, and/or choice of a suitable coding scheme.

According to embodiments of the invention additional channel information and/or the intended use of the requested resource are transmitted together with the priority values. The additional channel information and/or the intended use could for example comprise a signal delay, a phase shift, attenuation, interference estimation, noise estimation, a precoding matrix, and/or a code book index. This information may be used by the respective base station to avoid interferences. The respective base station estimates that the scheduling request of a cell not having been scheduled—e.g. because of a too low priority value—will be granted by another base station. Hence, the respective base station stores information about a possible future data transmission between the respective mobile telecommunication device and a neighbouring base station. Interferences can be reduced by taking this information into account for at least one future data transmission.

According to embodiments of the invention a dataflow is established from a core network and/or a master cell to the candidate cells directly after selecting the subset of cells as candidate cells. The data flow from the core network and/or the master cell to the candidate cells is advantageous for rapidly changing the first and the second plurality of cells. This is advantageous for example for rapidly changing channel conditions.

An uplink data flow is established from candidate cells to the core network and/or to the master cell.

In another aspect the invention relates to a base station for grouping a first plurality of cells contained in a subset of cells of a wireless telecommunication network to a first cluster for receiving uplink data from the mobile telecommunication device. A second plurality of cells contained in the subset of cells is grouped to a second cluster for transmitting downlink data to the mobile telecommunication device. The base station comprises means for receiving a measurement report from a mobile telecommunication device. The base station further comprises means for comparing the measurement results of the measurement report with a first criterion. Furthermore, the base station comprises means for selecting candidate cells for the first and the second cluster using the measurement report. The candidate cells fulfill a first criterion and selecting is performed individually for the mobile telecommunication device. The candidate cells constitute the subset of cells.

The base station also comprises means for selecting the first and the second plurality of cells from the subset of cells. The first plurality of cells fulfills at least one second criterion and the second plurality of cells fulfills at least one third criterion. The base station further comprises means for grouping the first plurality of cells to the first cluster and grouping the second plurality of cells to the second cluster. Furthermore, the base station comprises means for selecting a master cell and means for coordinating the first and the second cluster.

In another aspect the invention relates to a computer-readable storage medium comprising instructions that when executed by a base station cause the base station to perform a method of grouping a first plurality of cells and a second plurality of cells to a first and a second cluster. The computer-readable storage medium may for example be a digital storage and the program instructions may be executed by a processor of the base station. When executing the program instructions the base station apparatus is adapted for receiving a measurement report from a mobile telecommunication device and comparing the measurement report results with a first criterion. Candidate cells are then selected for the first and the second cluster using the measurement report wherein the candidate cells fulfill a first criterion and selecting is performed individually for the mobile telecommunication device. The candidate cells constitute the subset of cells. Then, the first and the second plurality of cells are selected from the subset of cells. The first plurality of cells fulfills at least one second criterion and the second plurality of cells fulfills at least one third criterion. The first plurality of cells is then grouped to the first cluster and the second plurality of cells is grouped to the second cluster. A master cell is selected for coordinating the first and the second cluster.

The above mentioned methods may also be performed by another network entity than a base station apparatus. Correspondingly, the computer-readable storage medium could also be adapted to case this other network entity to perform the above mentioned method.

In yet another aspect the invention relates to a mobile telecommunication system comprising a plurality of base stations according to embodiments of the invention.

BRIEF DESCRIPTION OF THE DRAWINGS

In the following embodiments of the invention are explained in greater detail, by way of example only, making reference to the drawings in which.

DETAILED DESCRIPTION

Like numbered elements in these Figs. are either identical elements or perform the same function. Elements which have been discussed previously will not necessarily be discussed in later Figs. if the function is identical.

Figure 1:
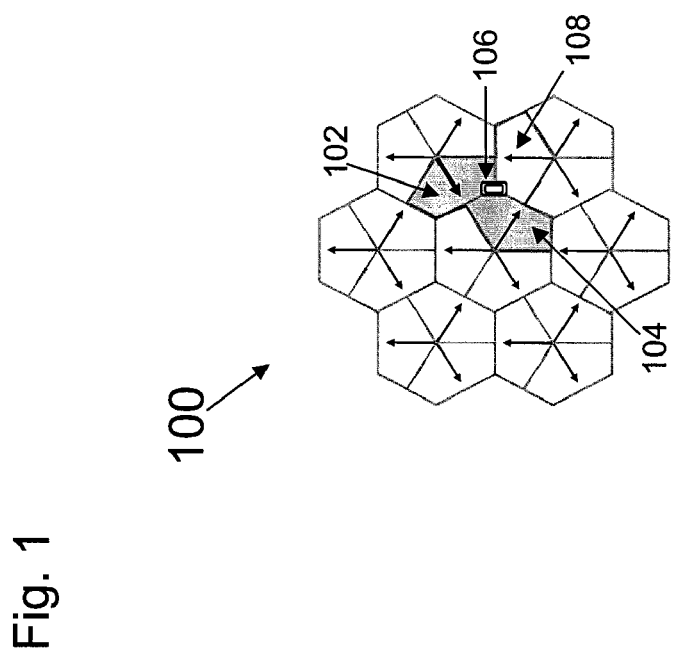
FIG. 1 is a schematic view of a mobile telecommunication network comprising a cell cluster and candidate cells.

FIG. 1 is a schematic view of a mobile telecommunication network 100 comprising several cells and base stations. There are 21 cells depicted, although the mobile telecommunication network 100 may comprise more or less cells. Cell 102 and 104 are served by different base stations and form together a cell cluster, in which data is transmitted to mobile telecommunication device 106 according to a multiple input and multiple output (MIMO) data transmission scheme. It is to be noted that the cells 102 and 104 form the cell cluster individually for mobile telecommunication device 106 and for at least one allocable resource. For another mobile telecommunication device (not depicted) other cells or the same cells may form the cell cluster for the MIMO data transmission scheme. Cells 102 and 104 have been selected to form the cell cluster out of candidate cells. The candidate cells in FIG. 1 are cells 102, 104 and 108. Cell 108 is not part of the cell cluster. The cells of the cell cluster are selected by considering scheduling decisions in the candidate cells. In other words, for example in cell 108 there are not enough free resources for MIMO connections to mobile telecommunication device 106.

In FIG. 1 cell 102 is the master cell of the cell cluster. The master cell manages the scheduling of allocable resources in cells 102 and 104 to mobile telecommunication device 106.

Cells 102 and 104 transmit and receive data to and from mobile telecommunication device 106 according to a MIMO scheme in uplink and/or downlink direction. In other words, the cell cluster may be the same for uplink and downlink or two different cell clusters are used for uplink and downlink MIMO data transmissions.

The cells of FIG. 1 could also be part of different mobile telecommunication networks. This could for example be the case near country borders. For example some cells could be located in a first country, while other cells are located in a second country.

Figure 2:
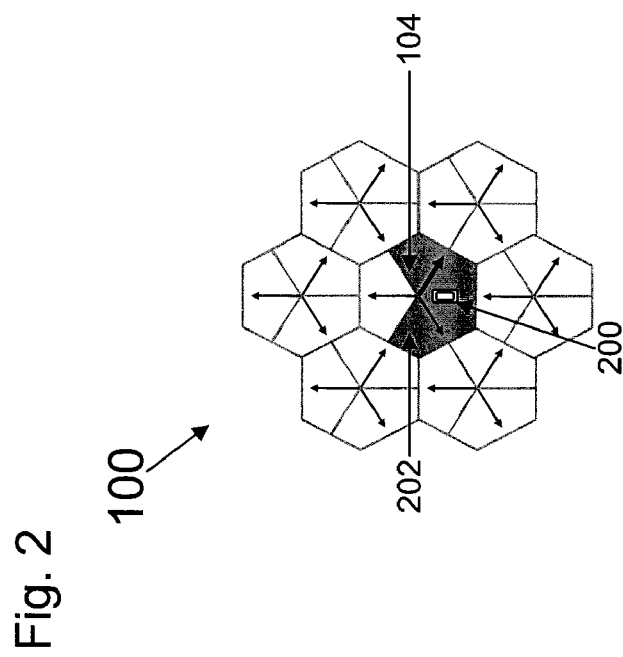
FIG. 2 is a schematic view of a mobile telecommunication network comprising a cell cluster served by one base station.

In FIG. 2 cells 104 and 202 are also candidate cells. There are no other candidate cells in FIG. 2. In other words, every candidate cell of FIG. 2 is also a cell of the cell cluster. The cell cluster is selected individually for mobile telecommunication device 200 and at least one allocable resource and differs from the cell cluster depicted in FIG. 1 for mobile telecommunication device 106. This is advantageous because for each mobile telecommunication device the best possible cell cluster is selected. In case of static cell clusters there are data transmission limiting problems at the edge of each cluster. This may for example be interferences and the fact that the mobile telecommunication device at the edge of the cell cluster is located under certain circumstances far away from any base station of the cell cluster. In other words, the dynamical cell clusters are advantageous for higher data transmissions and higher connection quality to the mobile telecommunication device 200.

In FIG. 2 cell 104 is the master cell of the cell cluster and coordinates the MIMO data transmission scheme. Both cells 104 and 102 of the cell cluster in FIG. 2 are served by the same base station. It is to be noted that also cells served by different base stations could be part of the cell cluster. This is for example the case in FIG. 1.

Figure 3:
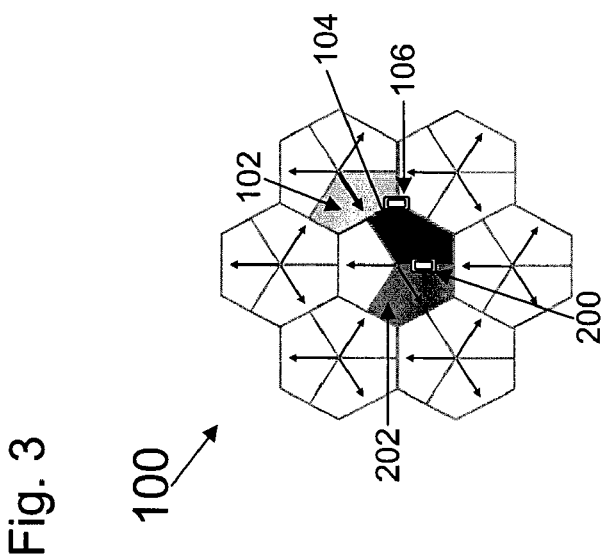
FIG. 3 is a schematic view of a mobile telecommunication network comprising two overlapping cell clusters.

FIG. 3 is a schematic view of mobile telecommunication network 100 comprising two cell clusters. A first cell cluster for a first allocable resource comprising cells 102 and 104 is used for MIMO data transmissions to mobile telecommunication device 106. The second cell cluster for the first allocable resource comprising cells 104 and 202 is used for MIMO data transmissions to mobile telecommunication device 200. The two cell clusters are depicted in FIGS. 1 and 2. The two cell clusters overlap in cell 104. Cell 104 is part of the first cell cluster and the second cell cluster. The master cell of the first cell cluster is cell 102 and the master cell of the second cell cluster is cell 104. When transmitting and receiving data to and from mobile telecommunication devices 106 and 200 in cell 104 the two cell clusters both need to schedule the data transmissions in cell 104. It is to be noted that data transmission from the mobile telecommunication device is performed in the first cell cluster, while data transmission to the mobile telecommunication device is performed in the second cell cluster. In other words, resources of cell 104 are needed as well by the cell cluster comprising cells 102 and 104 as by the cell cluster comprising cells 104 and 202. Each master cell now transmits a signal to cell 104 being indicative of a priority value. The priority value is an indicator of how urgent the respective resource is needed by the cell cluster. For example cell 102 transmits a priority value of 7 to cell 104. Cell 104 does not need to transmit a signal to another cell for transmitting the priority value because cell 104 itself is the master cell of the second cell cluster. If now the cell 104 determines a priority value of 5 for scheduling data transmissions to mobile telecommunication device 200, the respective resource is allocated to the cell cluster comprising cells 102 and 104 because of the higher priority value transmitted from cell 102 to cell 104.

Figure 4:
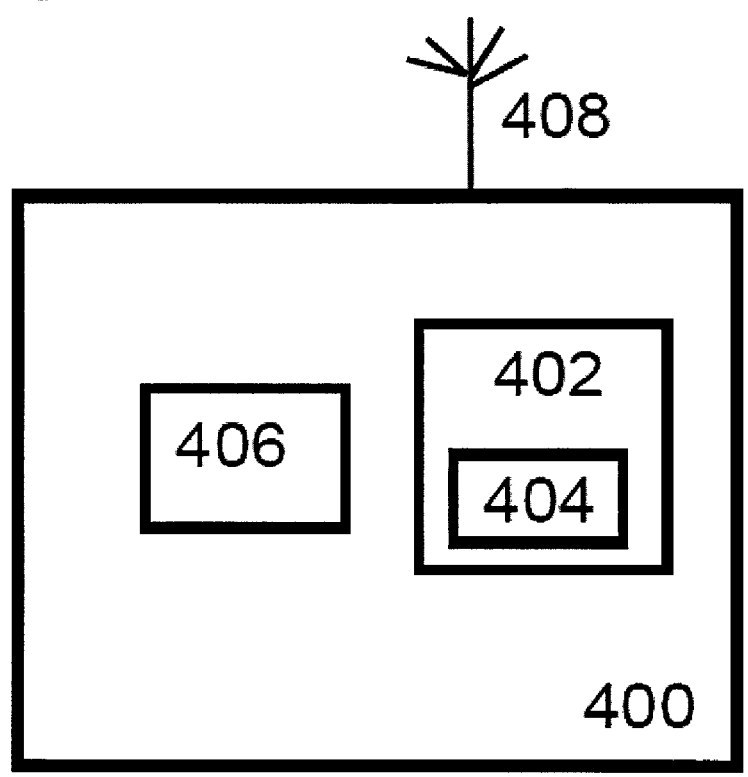
FIG. 4 is a block diagram of a base station.

FIG. 4 is a block diagram of a base station 400. Base station 400 comprises a processor 406 and a data storage 402 and an antenna means 408. Via antenna means 408 a connection to a mobile telecommunication device may be established and data and measurement reports can be received from the mobile telecommunication device. The processor 406 is adapted to compare measurement results of the measurement report with a first criterion. The processor 406 is further adapted to select candidate cells for a first and a second cluster using the measurement report. This selecting is performed individually for each mobile telecommunication device connected to the base station 400 and for at least one allocable resource. Antenna means 408 may also comprise a plurality of antennas.

The processor is further adapted to select a first and a second plurality of cells from the subset of cells. The first plurality and the second plurality of cells is further grouped by the processor 406 to the first and the second cluster.

The processor may further be adapted for selecting a master cell and coordinating the first and the second candidate cells, if the base station 400 is selected as the base station of a master cell.

The processor 406 may implement all those features by executing program instructions 404 stored in data storage 402.

The above mentioned means 402-408 could also be comprised by another network entity. In this case the other network entity would be adapted to perform a method according to embodiments of the invention.

Figure 5:
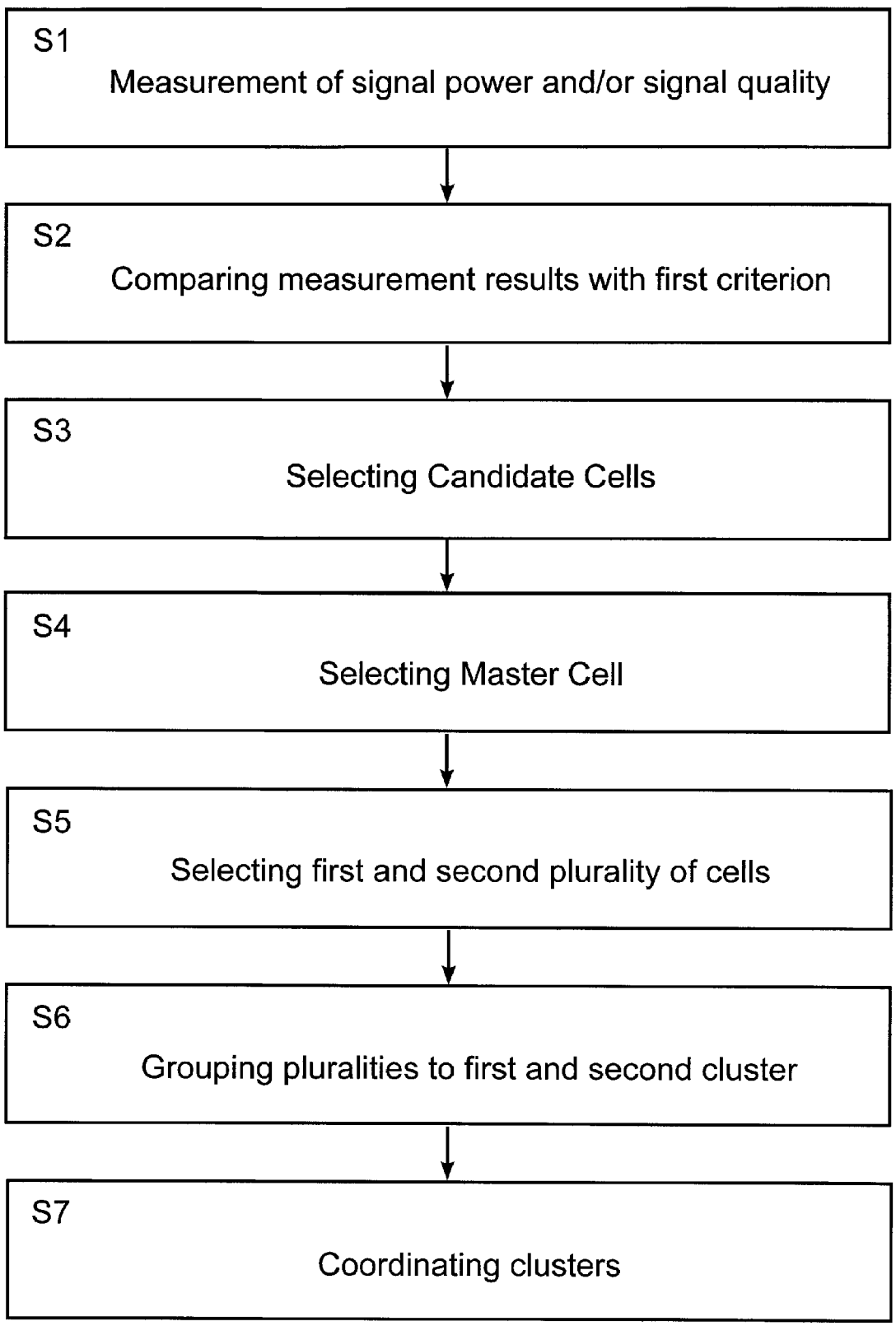
FIG. 5 is a flow diagram of a method according to embodiments of the invention.

FIG. 5 is a flow diagram of a method according embodiments of the invention. In a first step S1 a a measurement of signal power and/or signal quality of signals received by the mobile telecommunication device from at least one cell of the wireless telecommunication network is performed and a respective measurement report is generated. The measurement report is then compared in step S2 with a first criterion, which may for example be a signal power and/or a signal quality threshold. In step S3 candidate cells for the first and the second cluster are selected by using the measurement report. The candidate cells fulfill the first criterion and selecting is performed individually for each mobile telecommunication device. In step S4 a master cell is selected, which coordinates the first and the second candidate cells.

After having selected individually the candidate cells the first and the second plurality of cells is selected in step S5. The first and the second plurality of cells fulfill at least one second and one third criterion respectively. The cells of the first and the second plurality of cells may be identical cells or the cells of the first and second plurality may differ from each other. Also overlapping first and second pluralities are possible, in fact this is even probable.

In step S6 the first and the second plurality of cells are grouped to the first and second group respectively and data transmission in the first and second cluster is performed according to a MIMO data transmission scheme. The first cluster may for example be used for uplink and the second cluster may for example be used for downlink. In step S7 the master cell coordinates the data transmission and reception in the first and the second cluster.

It is to be noted that the above numbering of the method steps is exemplary and does not need to be performed in this order.

| List of reference numerals | |
|---|---|
| 100 | Mobile telecommunication network |
| 102 | Cell |
| 104 | Cell |
| 106 | Mobile telecommunication device |
| 108 | Candidate cell |
| 200 | Mobile telecommunication device |
| 202 | Cell |
| 400 | Base station |
| 402 | Data storage |
| 404 | Program instructions |
| 406 | Processor |
| 408 | Antenna means |

The invention claimed is:

1. A method of grouping a first plurality of cells contained in a subset of cells of a wireless telecommunication network to a first cluster for receiving uplink data from a mobile telecommunication device, and grouping a second plurality of cells contained in the subset of cells to a second cluster for transmitting downlink data to the mobile telecommunication device, wherein the method comprises:
   performing a measurement of signal power and/or signal quality of signals received by the mobile telecommunication device from at least one cell of the wireless telecommunication network;
   generating a measurement report by the mobile telecommunication device, the measurement report comprising measurement results of the measurement;
   comparing the measurement results with a first criterion;
   selecting candidate cells for the first and the second cluster, wherein the received signals of the candidate cells fulfil the first criterion, wherein selecting is performed individually for the mobile telecommunication device, and wherein the candidate cells constitute the subset of cells;
   selecting the first and the second plurality of cells from the subset of cells, wherein the first plurality of cells fulfils at least one second criterion and the second plurality of cells fulfils at least one third criterion;
   grouping the first plurality of cells to the first cluster and grouping the second plurality of cells to the second cluster;
   selecting a master cell, wherein the master cell fulfils a fourth criterion, wherein the fourth criterion is a minimum connection quality for receiving uplink data from the mobile telecommunication device; and
   coordinating data transmission and reception in the first and the second cluster by the master cell.

2. Method according to claim 1, wherein the master cell is a candidate cell.

3. Method according to claim 1, wherein the measurement report comprises desired channel information and a preselection of the mobile telecommunication device for the first and the second plurality of cells, and wherein the desired channel information is taken into account for selecting the first and the second plurality of cells.

4. Method according to claim 1, wherein the measurement report is transmitted to a base station, and wherein the selecting and/or the grouping is performed by the base station.

5. Method according to claim 1, wherein the first criterion comprises a minimum signal power level and/or a minimum signal quality level, and wherein the minimum signal power level and/or the minimum signal quality level are adjusted dynamically.

6. Method according to claim 1, wherein the second and the third criterion are criteria considering scheduling decisions in the candidate cells.

7. Method according to claim 1, wherein the first criterion comprises an amount of traffic exchanged between the candidate cells.

8. Method according to claim 1, wherein a cell of the first or the second plurality of cells receives a first signal from the master cell and at least one second signal from a further master cell, the further master cell coordinating a third cluster, wherein the third cluster comprises said cell, the first signal being indicative of a first priority value for a resource, the second signal being indicative of a second priority value for the resource, and wherein said cell takes into account the first and the second priority value for resource allocation.

9. Method according to claim 8, wherein receiving of the first and the second signal and the taking into account of the first and the second priority value is performed iteratively.

10. A base station for grouping a first plurality of cells contained in a subset of cells of a wireless telecommunication network to a first cluster for receiving uplink data from a mobile telecommunication device, and grouping a second plurality of cells contained in the subset of cells to a second cluster for transmitting downlink data to the mobile telecommunication device, wherein the base station is configured to:
- receive a measurement report from a mobile telecommunication device;
- compare measurement results of the measurement report with a first criterion,
- select candidate cells for the first and the second cluster using the measurement report, wherein the candidate cells fulfil the first criterion, wherein selecting is performed individually for the mobile telecommunication device, and wherein the candidate cells constitute the subset of cells;
- select the first and the second plurality of cells from the subset of cells, wherein the first plurality of cells fulfils at least one second criterion and the second plurality of cells fulfils at least one third criterion;
- group the first plurality of cells to the first cluster and grouping the second plurality of cells to the second cluster;
- select a master cell, wherein the master cell fulfils a fourth criterion, wherein the fourth criterion is a minimum connection quality for receiving uplink data from the mobile telecommunication device; and
- coordinate the first and the second cluster.

11. A non-transitory computer-readable storage medium comprising instructions that when executed by a base station cause the base station to perform a method of grouping a first plurality of cells contained in a subset of cells of a wireless telecommunication network to a first cluster for receiving uplink data from a mobile telecommunication device, and grouping a second plurality of cells contained in the subset of cells to a second cluster for transmitting downlink data to the mobile telecommunication device, wherein the method comprises the following steps:
- receiving a measurement report from a mobile telecommunication device;
- comparing measurement results of the measurement report with a first criterion,
- selecting candidate cells for the first and the second cluster using the measurement report, wherein the candidate cells fulfil the first criterion, wherein selecting is performed individually for the mobile telecommunication device, and wherein the candidate cells constitute the subset of cells;
- selecting the first and the second plurality of cells from the subset of cells, wherein the first plurality of cells fulfils at least one second criterion and the second plurality of cells fulfil at least one third criterion;
- grouping the first plurality of cells to the first cluster and grouping the second plurality of cells to the second cluster;
- selecting a master cell, wherein the master cell fulfils a fourth criterion, wherein the fourth criterion is a minimum connection quality for receiving uplink data from the mobile telecommunication device; and
- coordinating the first and the second cluster.

12. Mobile telecommunication system comprising a plurality of base stations according to claim 10.

* * * * *